United States Patent [19]
Itatsu

[11] Patent Number: 5,818,007
[45] Date of Patent: Oct. 6, 1998

[54] GUN ARM EXCHANGE STRUCTURE FOR SPOT WELDING GUN AND METHOD FOR THE SAME

[75] Inventor: Makoto Itatsu, Saitama-ken, Japan

[73] Assignee: Nissan Mortor Co., Ltd., Kanagawa-ken, Japan

[21] Appl. No.: 789,340

[22] Filed: Jan. 27, 1997

[30]     Foreign Application Priority Data

Feb. 13, 1996  [JP]  Japan .................................. 8-025266

[51] Int. Cl.⁶ .................................................. B23K 11/11
[52] U.S. Cl. ........................................................ 219/86.25
[58] Field of Search ............................... 219/86.8, 86.25, 219/86.33, 89, 119, 86.41, 86.51, 86.61; 201/14, 19, 27, 31, 41, 42

[56]     References Cited

U.S. PATENT DOCUMENTS

| | | | |
|---|---|---|---|
| 4,550,236 | 10/1985 | Nakadate et al. | 219/86.3 |
| 4,855,560 | 8/1989 | Sonoda et al. | 219/86.25 |
| 4,910,373 | 3/1990 | Fuse | 219/86.8 |
| 5,091,623 | 2/1992 | Obara et al. | 219/89 |
| 5,628,923 | 5/1997 | Nishiwaki | 219/86.25 |

FOREIGN PATENT DOCUMENTS 62-16887  1/1987  Japan .

*Primary Examiner*—Adolf Berhane
*Attorney, Agent, or Firm*—McDermott, Will & Emery

[57]     ABSTRACT

There can be provided a spot welding gun in which a gun arm can be detachably attached to a gun main body, capable of conducting welding operation without increase in size and with good precision. Coupling portions 7 used to attach/detach the gun arm 9 having the fixed electrode 13 to/from the gun main body 1 having the pressure electrode 11 comprise an insertion recess portion which is formed on the gun main body 1 side to be tapered along the direction perpendicular to pressure direction of the pressure electrode 11, and an insertion portion which is formed on the gun arm 9 side to be tapered along the direction perpendicular to the pressure direction for easy insertion into the insertion recess portion.

12 Claims, 7 Drawing Sheets

GUN ARM EXCHANGE STRUCTURE FOR SPOT WELDING GUN AND METHOD FOR THE SAME

BACKGROUND OF THE INVENTION

The present invention relates to a gun arm exchange structure for a spot welding gun including a gun main body provided to a top end of a robot arm and having a pressure electrode for applying pressure on a work which is held between a fixed electrode and the pressure electrode and a gun arm detachably attached to the gun main body and having the fixed electrode, and a method for use in the gun arm exchange structure.

In the related art, for example, a gun arm exchange structure for use in a spot welding gun having a so-called C type gun arm has been set forth in Patent Application Publication (KOKAJ) 62-16887. In this Publication, a gun arm having a fixed electrode is detachably attached to a gun main body provided to a top end of a robot arm and having the pressure electrode. With the use of the pressure electrode and the fixed electrode, pressure is applied on a work which is held between them. The pressure electrode is projected forward from the gun main body. The gun arm is bent to form a substantial C-shape as a whole such that the fixed electrode is arranged to oppose to the projected pressure electrode.

A pressure cylinder is provided as a pressurizing means to move the pressure electrode toward the fixed electrode. On the front side of the gun main body positioned adjacent to the pressure cylinder, a taper fitting hole is formed in the same direction as the pressure direction of the pressure electrode. While, a taper fitting end portion which may be fitted into the taper fitting hole is formed on the gun arm. In other words, by inserting the taper fitting end portion formed on the gun arm into the taper fitting hole formed in the gun main body while moving the fixed electrode of the gun arm toward the pressure electrode of the gun main body, the gun arm can be fitted into the gun main body. After fitted, the gun arm is fixed by a clamp member provided on the gun main body.

However, as described above, in the gun arm exchange structure for the spot welding gun in the related art, coupling portions between the gun arm and the gun main body are so constructed that the gun arm is coupled to the gun main body by inserting the taper fitting end portion formed on the gun arm into the taper fitting hole formed in the gun main body in the opposite direction to the pressure direction of the pressure electrode. Therefore, since pressure is applied by the pressure electrode during spot welding operation in the direction to pull out the gun arm from the gun main body, surface pressure of power supply portions provided on the coupling portions between the gun arm and the gun main body is reduced. As a result, such a problem has arisen that the above coupling portions interferes with spot welding operation. Further, positioning between the pressure electrode and the fixed electrode, i.e., centering of the gun arm relative to the gun main body, is needed upon fitting the gun arm into the gun main body. However, according to the structure in the above Publication, positioning has not been sufficiently achieved, so that welding operation with good precision has not expected. Still further, since fitting direction of the gun arm into the gun main body is a longitudinal direction of the gun arm, a dimension of the gun arm is increased, thereby yielding increase in size of the spot welding gun.

SUMMARY OF THE INVENTION

Therefore, it is an object of the present invention to provide a gun arm exchange structure for a spot welding gun, in which a gun arm is detachable attached to a gun main body, capable of executing welding operation with good precision and without increase in size and a method for use in the gun arm exchange structure.

In order to achieve the above object, according to an aspect of the present invention, there is provided a gun arm exchange structure for a spot welding gun comprising: a gun main body provided to a top end of a robot arm and having a pressure electrode; and a gun arm detachably attached to said gun main body and having a fixed electrode, pressure being applied by said pressure electrode on a work which is held between said fixed electrode and said pressure electrode; wherein an insertion recess portion is formed on one side of both coupling portions of said gun main body and said gun arm, inner surfaces of said insertion recess portion being tapered along a direction perpendicular to a pressure direction along which pressure is applied by said pressure electrode toward said fixed electrode, and an insertion portion is formed on other side of both coupling portions to have a taper shape which permits said insertion portion to be inserted into said insertion recess portion from a direction perpendicular to said pressure direction and to be fixed therein.

According to another aspect of the present invention, in addition to the above aspect, there is provided a gun arm exchange structure further comprising pressure receiving portions provided in said coupling portions to receive said pressure applied by said pressure electrode respectively; and power supply portions provided in said pressure receiving portions respectively and having electric contacts which contact mutually to supply electric current from said gun main body to said fixed electrode of said gun arm.

According to still another aspect of the present invention, in addition to the above aspect, there is provided a gun arm exchange structure further comprising a positioning pin provided on said gun main body, said positioning pin being projected toward said gun arm to execute positioning of said gun arm relative to said gun main body when said insertion portion is inserted into said insertion recess portion and fixed therein.

According to yet still another aspect of the present invention, in addition to the above aspect, there is provided a gun arm exchange structure further comprising: pressure receiving portions provided in said coupling portions to receive said pressure applied by said pressure electrode respectively; power supply portions provided in said pressure receiving portions respectively and having electric contacts which contact mutually to supply electric current from said gun main body to said fixed electrode of said gun arm; and a positioning pin provided on said gun main body, said positioning pin being projected toward said gun arm to execute positioning of said gun arm relative to said gun main body when said insertion portion is inserted into said insertion recess portion and fixed therein; wherein said positioning pin generates surface pressure on said power supply portions by thrusting said gun arm in a state wherein said positioning pin is projected to execute positioning.

According to further aspect of the present invention, in addition to the above aspect, there is provided a gun arm exchange method for a spot welding gun including a gun main body provided to a top end of a robot arm and having a pressure electrode, and a gun arm detachably attached to said gun main body and having a fixed electrode, pressure being applied by said pressure electrode on a work which is held between said fixed electrode and said pressure electrode, said method comprising the step of: fitting said gun arm into said gun main body by inserting an insertion portion is formed on other side of both coupling portions to have a taper shape which permits said insertion portion to be inserted into said insertion recess portion from a direction perpendicular to said pressure direction and to be fixed therein into an insertion recess portion is formed on one side of both coupling portions of said gun main body and said gun arm, inner surfaces of said insertion recess portion being tapered along a direction perpendicular to a pressure direction along which pressure is applied by said pressure electrode toward said fixed electrode.

According to the above aspect and further aspect of the present invention, the gun arm may be fitted into the gun main body by inserting the insertion portion provided on one of the gun arm and the gun main body into the insertion recess portion provided on the other of the gun arm and the gun main body along the direction perpendicular to the pressure direction of the pressure electrode. For this reason, pressure applied by the pressure electrode is in no ways put in the direction to remove the gun arm from the gun main body, then surface pressure on the power supply portions of the coupling portions between the gun arm and the gun main body can be assured at a desired value to thus enable welding operation to be executed without trouble, and then increase in length of the gun arm in the longitudinal direction can be suppressed even in the structure having the coupling portions so that increase in size of the welding gun can be prevented.

According to the above another aspect of the present invention, pressure is applied by the pressure electrode to pressurized portions to thus increase surface pressure on the power supply portions formed on the pressurized portions, so that electric current can be supplied to the fixed electrode of the gun arm. As a result, welding operation can be conducted without trouble.

According to the above still another aspect of the present invention, if positioning between the gun arm and the gun main body is carried out by virtue of the positioning pin, centering of the pressure electrode relative to the fixed electrode can be accomplished readily, thereby yielding welding operation with good precision.

According to the above yet still another aspect of the present invention, since generation of surface pressure on the power supply portions as well as positioning between the gun arm and the gun main body may be achieved by a single mechanism including the positioning pin, structural simplification can be accomplished.

Other and further objects and features of the present invention will become obvious upon an understanding of the illustrative embodiments about to be describe in connection with the accompanying drawings or will be indicated in the appended claims, and various advantages not referred to herein will occur to one skilled in the art upon employing of the invention in practice.

DETAILED DESCRIPTION OF THE EMBODIMENTS

Figure 1:
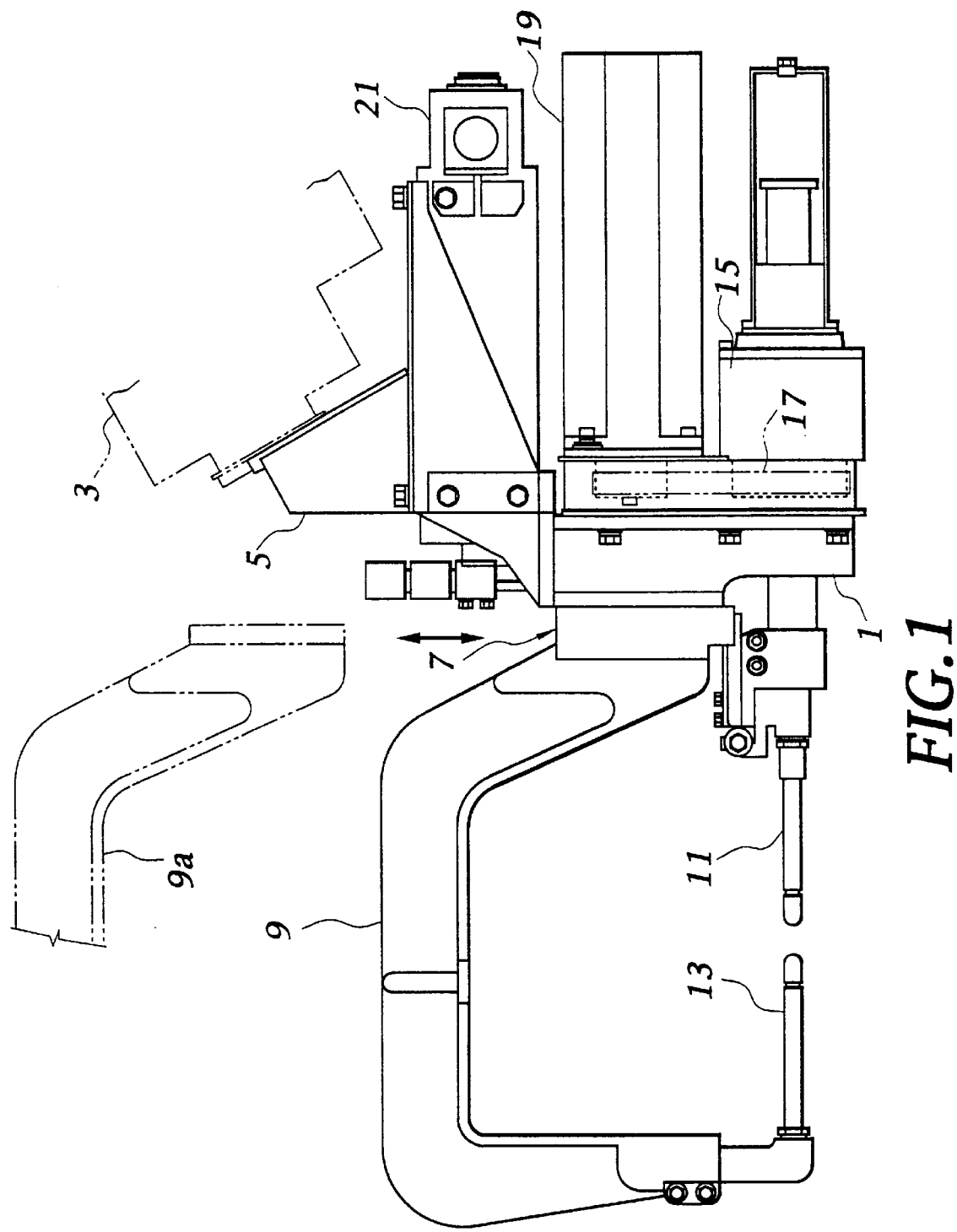
FIG. 1 is a side view showing a gun arm exchange structure for a spot welding gun according to an embodiment of the present invention.

Various embodiments of the present invention will be described with reference to the accompanying drawings hereinafter. It should be noted that the same or similar reference numerals are applied to the same or similar parts and elements throughout the drawings, and the description of the same or similar parts and elements will be omitted or simplified.

Figure 2:
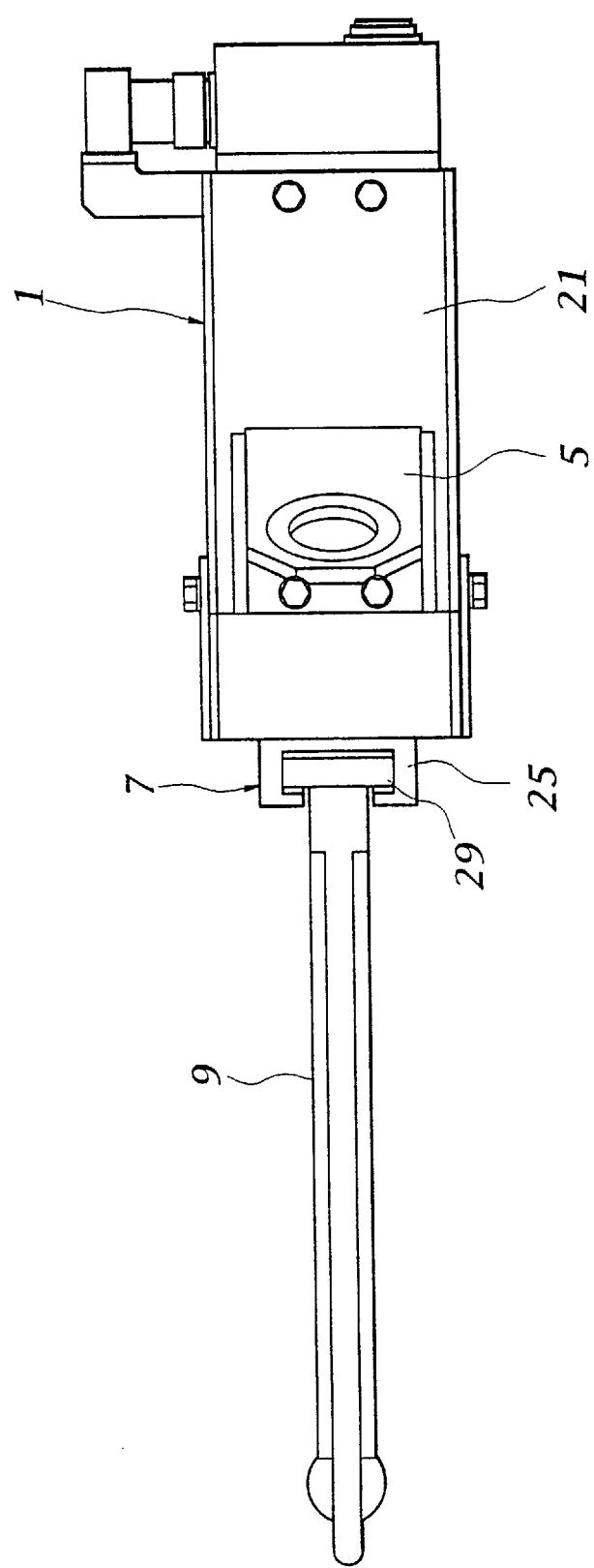
FIG. 2 is a top view showing the gun arm exchange structure shown in FIG. 1.

FIG. 1 is a side view showing a gun arm exchange structure for a spot welding gun according to an embodiment of the present invention. FIG. 2 is a top view showing the gun arm exchange structure shown in FIG. 1. A gun main body 1 is mounted on a top end of a robot arm 3 via a gun bracket 5. A C-shaped gun arm 9 is detachably attached to the gun main body 1 via a coupling portion 7. A pressure electrode 11 is provided on the gun main body 1 to project forward. A fixed electrode 13 is provided on the gun arm 9 to oppose to the fixed electrode 11. A gun arm 9a shown by a chain double-dashed line is in a state wherein it is removed from the gun main body 1.

A base end portion of the pressure electrode 11 is connected to a ball screw and bearing unit portion 15. The unit portion 15 is connected to a servo motor 19 via a timing belt 17. A pressure applying operation toward the fixed electrode 13 side of the pressure electrode 11 is carried out by operation of the servo motor 19. A transformer 21 is provided on the gun main body 1 and over the servo motor 19.

Figure 3:
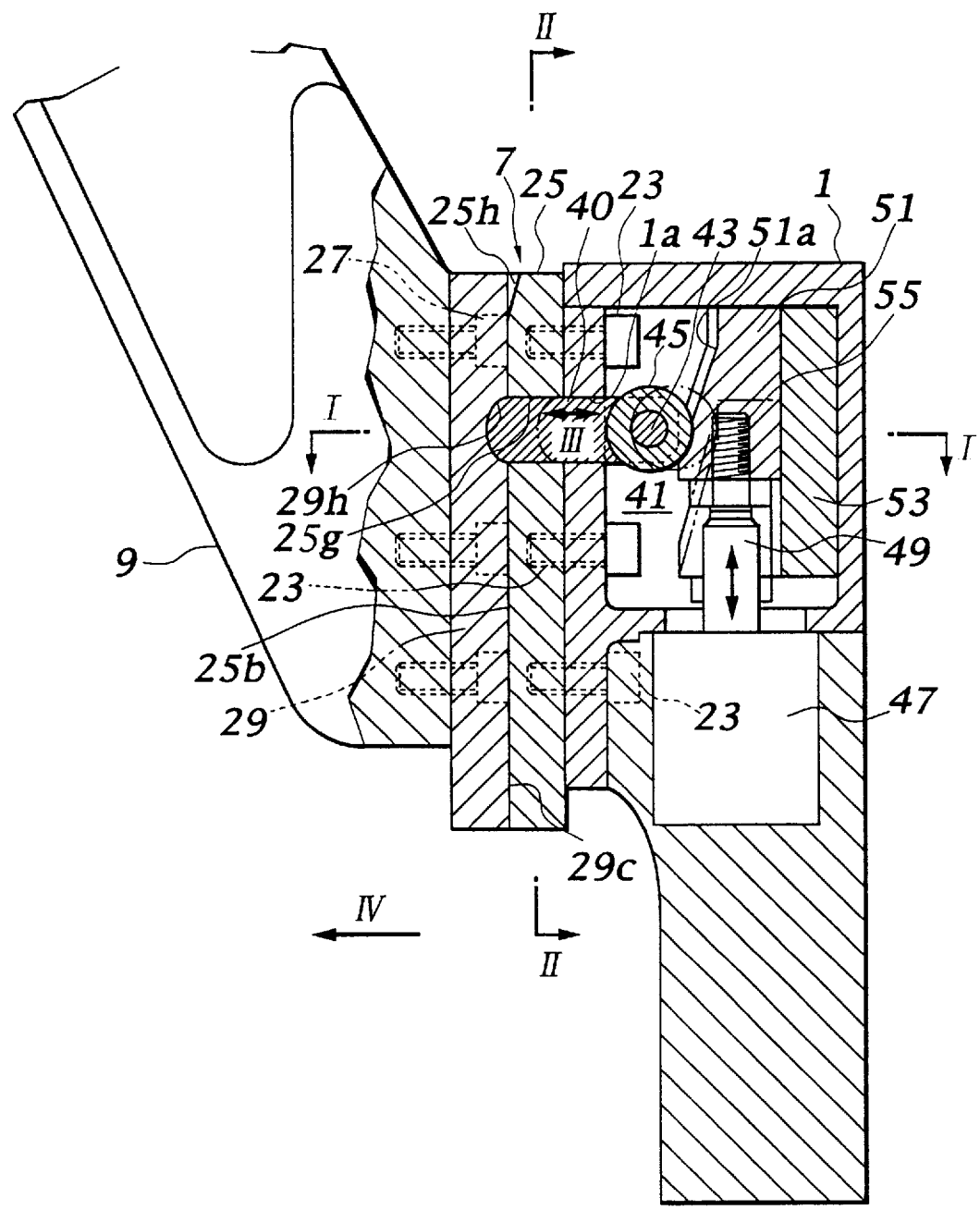
FIG. 3 is an enlarged sectional view showing coupling portions of a gun arm and a gun main body shown in FIG. 1.
Figure 4:
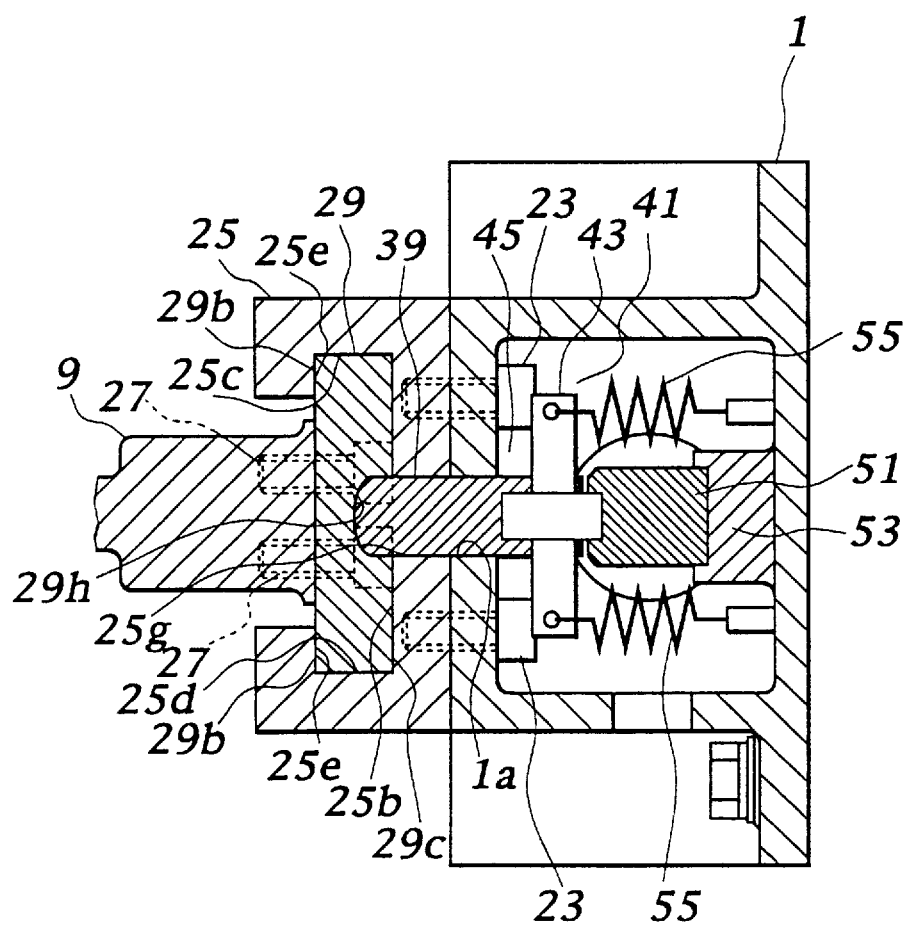
FIG. 4 is a sectional view, taken along a line I—I in FIG. 3, showing the coupling portions of the gun arm and the gun main body.

FIG. 3 is an enlarged sectional view showing coupling portions of a gun arm and a gun main body shown in FIG. 1. FIG. 4 is a sectional view, taken along a line I—I in FIG. 3, showing the coupling portions of the gun arm and the gun main body. In the coupling portion 7, a gun main body side coupling member 25 is fixed to the gun main body 1 by bolts 23 while a gun arm side coupling member 29 is fixed to the gun arm 9 by bolts 27. The coupling members 25 and 29 on the main body side and the arm side are made of copper alloy respectively.

Figure 5:
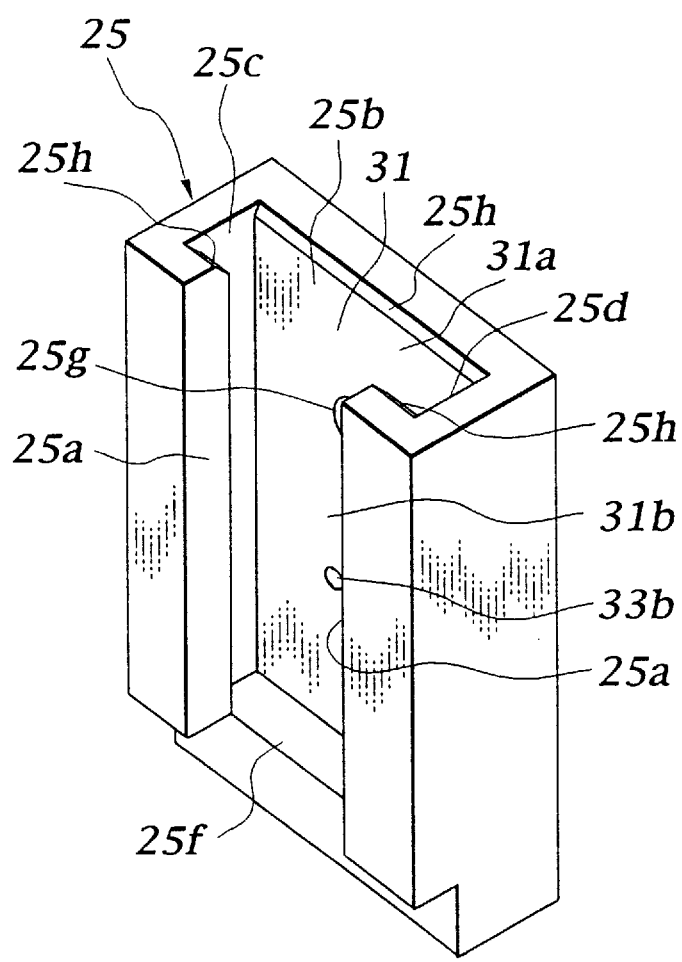
FIG. 5 is a perspective view showing a coupling member of the gun main body.

As shown by a perspective view in FIG. 5, an insertion recess portion 31 is formed in the main body side coupling member 25 so as to extend in the vertical direction perpendicular to the pressure direction (direction indicated by an arrow III in FIGS. 3 and 5) of the pressure electrode 11. On the other hand, as shown by a perspective view in FIG. 6, the plate-like insertion portion to be inserted into the insertion recess portion 31 is formed in the arm side coupling member 29.

An insertion port 31a used to insert the arm side coupling member 29 into an upper surface of the insertion recess portion 31 is formed in the insertion recess portion 31. If flanges 25a are so formed on both sides of the main body side coupling member 25 that they are projected to oppose to each other on the gun arm 9 side, then an opening portion 31b which serves as a clearance opened from the insertion recess portion 31 when the gun arm 9 is fitted into the gun main body 1 is formed.

A surface 25b in the insertion recess portion 31 opposing to the opening portion 31b is formed as an inclined surface in which a lower end side is close to the opening portion 31b rather than an upper end side. Surfaces 25c, 25d being adjacent to both side edges of the surface 25b and opposing to each other are formed as inclined surfaces in which respective distances between their lower ends are short rather than those between their upper ends. Accordingly, the insertion recess portion 31 is tapered downward from the insertion port 31a on the upper side.

As shown in FIG. 3, inner surfaces 25e of a pair of flanges 25a formed in the insertion recess portion 31 are not formed as inclined surfaces but are formed at a right angle with the pressure direction of the pressure electrode 11 shown by an arrow IV. Therefore, the inner surfaces 25e constitute power supply portions having electric contacts for supplying electric current from the gun main body 1 to the fixed electrode of the gun arm 9. Upper end portions of the surfaces 25b, 25e are formed as chamfer surfaces 25h to enhance an opening area of the insertion port 31a.

Figure 6:
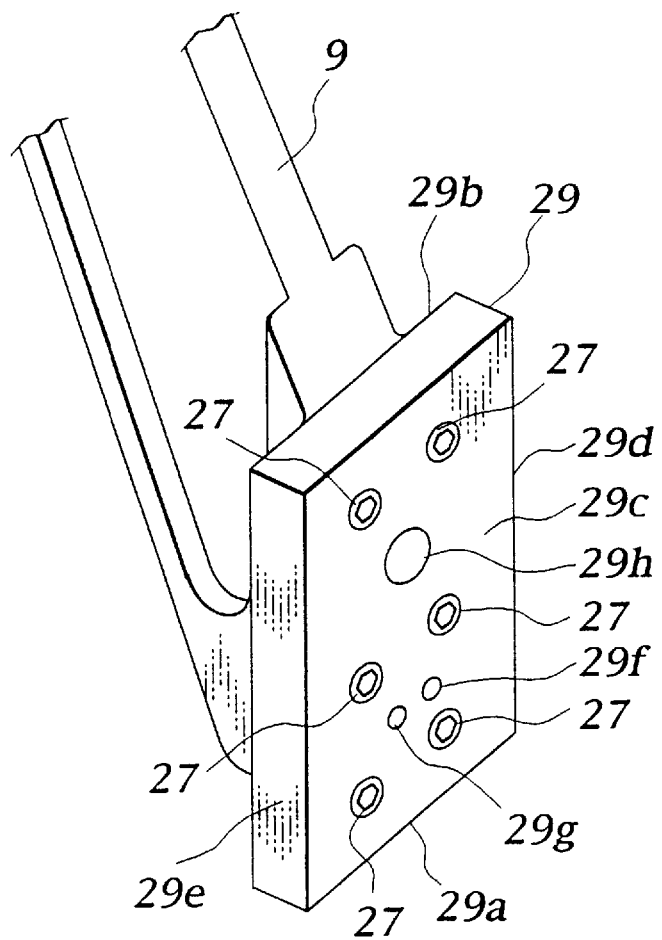
FIG. 6 is a perspective view showing a coupling member of the gun arm.

A bottom portion 25f is formed at lower end of the insertion recess portion 31. When the arm side coupling member 29 is inserted into the insertion recess portion 31, the bottom portion 25f abuts to the lower end surface 29a of the arm side coupling member 29 to thus position the gun arm 9 in the vertical direction. The arm side coupling member 29 is tapered to the lower end such that it contacts tightly respective surfaces 25b, 25c, 25d, 25e in the insertion recess portion 31 under the condition that the lower end surface 29a contacts the bottom surface portion 25f in the insertion recess portion 31. In other words, as shown in FIG. 6, in the arm side coupling member 29, a surface 29c opposite to the surface 29b to which the gun arm 9 is fitted is formed as an inclined surface in which a lower end surface 29a is close to the surface 29b rather than an upper end surface. Both side surfaces 29d, 29e form inclined surfaces in which a distance between the lower end surfaces 29a is shorter than a distance between the upper end surfaces.

As shown in FIG. 3, surfaces 29b into which the gun arm 9 is fitted are not formed as inclined surfaces but are formed at a right angle with the pressure direction of the pressure electrode 11 shown by the arrow IV. Electric contacts are provided to the surfaces 29b so as to constitute the power supply portions together with the surfaces 25e in the flanges 25a. In other words, the power supply portions made up of the surfaces 29b and the surfaces 25e of the main body side coupling member 25 are provided on pressure receiving areas which receive pressure applied by the pressure electrode 11.

Figure 7:
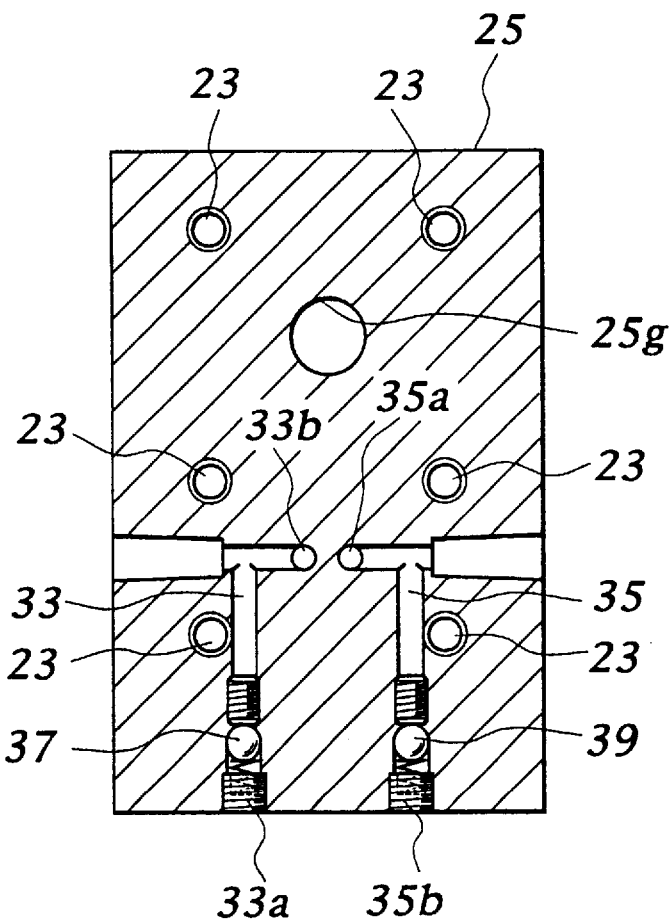
FIG. 7 is a sectional view, taken along a line II—II in FIG. 3, showing the coupling member of the gun main body from which the gun arm is removed.

FIG. 7 is a sectional view, taken along a line II—II in FIG. 3, showing the coupling member 25 of the gun main body 1 from which the gun arm 9 is removed. Cooling water paths 33, 35 supplying cooling water to the gun arm 9 are formed on the lower side of the main body side coupling member 25. The path 33 includes a supply port 33a for supplying cooling water to an inside of the main body side coupling member 29, and an outlet port 33b for flowing out cooling water from the inside of the main body side coupling member 25 to an inside of the arm side coupling member 29. The path 35 includes an inlet port 35a for flowing in cooling water from the inside of the arm side coupling member 29 to the inside of the main body side coupling member 25, and a discharge port 35b for discharging cooling water from the inside of the main body side coupling member 25 to an exterior of the gun.

In contrast, an inlet port 29f and an outlet port 29g which are connected to the outlet port 33b and the inlet port 35a respectively are formed on the surface 29c of the arm side coupling member 29. These inlet port 29f and outlet port 29g are connected to cooling water paths (not shown) formed in the gun arm 9. Mechanical valves 37 and 39 are provided at the supply port 33a and the discharge port 35b in the paths 33 and 35 respectively to attach and detach cooling water pipings.

As shown in FIGS. 3 and 4, a positioning pin 40 for use in positioning upon fitting the gun arm 9 into the gun main body 1 is provided to the gun main body 1. The positioning pin 40 is inserted into slide hole 1a, 25g, which being formed in the gun main body 1 and the main body side coupling member 25, to be slid therein in the direction indicated by an arrow III. When a left top end in FIG. 3 is entered into the recess portion 29h formed in the arm side coupling member 29, the gun arm 9 is positioned to the gun main body 1.

A base end portion of the positioning pin 40 is arranged to project into a space 41 formed in the gun main body 1. A roller 45 is engaged rotatably with the projected base end portion via connecting pins 43. On the contrary, as shown in FIG. 3, an air cylinder 47 is equipped below the space 41 and a rod 49 of the air cylinder 47 is projected into the space 41. A cam 51 is fixed to an projected end of the rod 49. As shown in FIG. 3, a left-down cam surface 51a is formed on the left side surface of the cam 51. If the cam 51 is lifted up by the air cylinder 47, the cam surface 51a pushes the roller 45 to cause the positioning pin 40 to shift to the left side in FIG. 3. Consequently, a top end of the positioning pin 40 is caused to be fitted into a positioning recess portion 29h formed in the gun arm 9. When it is fitted into the positioning recess portion 29h, the positioning pin 40 thrusts the arm side coupling member 29 to thereby generate surface pressure on the surface of the power supply portion. The cam 51 is moved vertically along a cam guide 53 fixed on the gun main body 1 side.

As shown in FIG. 4, return springs 55 are provided between ends of the connecting pins 43 and the right side inner wall of the space 41 in the gun main body 41. Therefore, when the cam 51 is moved downward in FIG. 3, the positioning pin 40 is caused by the return springs 55 to be moved to the right side in FIG. 3 so that it is separated from the positioning recess portion 29h.

In the above gun arm exchange structure for the spot welding gun, when the gun arm 9 is to be fitted into the gun main body 1, the lower end surface 29a of the arm side coupling member 29 serving as the insertion portion shown in FIG. 6 is inserted into the upper insertion port 31a of the insertion recess portion 31 of the main body side coupling member 25. In this event, since both the insertion recess portion 31 and the insertion portion (arm side coupling member 29) are formed to have taper shapes to their top portions, insertion operation is carried out readily. When the gun arm 9 has been inserted completely into the gun main body 1, the lower end surface 29a of the arm side coupling member 29 abuts to the bottom surface 25f of the insertion recess portion 31 to thus determine positioning of the insertion direction.

After insertion operation has been completed, the cam 51 is lifted up to a position indicated by a solid line in FIG. 3 if the air cylinder 47 is operated. Therefore, the positioning pin 40 slides in the slide holes 1a, 25g to enter into the positioning recess portion 29h of the gun arm 9 side. As a result, the gun arm 9 is automatically positioned to the gun main body 1 so that alignment between the pressure electrode 11 and the fixed electrode 13, i.e., centering between them can be automatically achieved.

Further, after insertion operation has been finished, the surface (power supply portion) 25e in the insertion recess portion 31 of the main body side coupling member 25 tightly contacts the surface (power supply portion) 29b of the arm side coupling member 29 to provide electric connection between the gun arm 9 and the gun main body 1. Consequently, electric power can be supplied from the gun main body 1 side to the fixed electrode 13 of the gun arm 9. Still further, as with the cooling water paths, the outlet port 33b and the inlet port 35a of the gun main body 1 side are connected to the inlet port 29f and the outlet port 29g of the gun arm 9 side respectively. Thus cooling water is supplied to the gun arm 9 side via the cooling water piping connected to the gun main body 1.

In this state, spot welding operation may be effected after a work is placed between the pressure electrode 11 and the fixed electrode 13. At this time, since pressure direction of the pressure electrode 11 is selected in the direction perpendicular to the insertion direction along which the arm side coupling member 29 is inserted into the insertion recess portion 31 of the gun main body 1, pressure does not affect in the direction along which the gun arm 9 is drawn out from the gun main body 1. Welding operation can thus be conducted as desired. In addition, since pressure is applied by the pressure electrode 11 to increase surface pressure on the power supply portions, power supply operation can be assured firmly to permit welding operation with good precision.

Surface pressure on the power supply portions is generated by thrusting the arm side coupling member 29 by means of the positioning pin 40. As described above, since surface pressure is also generated by the pressure electrode 11 in the present invention, surface pressure on the power supply portions which is to be generated by the positioning pin 40 can be made small. Therefore, the air cylinder 47 serving as an actuator can be made small in size to thus attain a compact air cylinder.

The coupling portions 7 between the gun main body 1 and the gun arm 9 are provided in the direction perpendicular to the longitudinal direction (lateral direction in FIG. 1) of the gun arm 9 and within a length of the gun main body 1 along this direction. Therefore, even if the welding apparatus is so constructed that the gun arm 9 is detachably attached to the gun main body 1, increase in size of the spot welding gun can be avoided.

Figure 8:
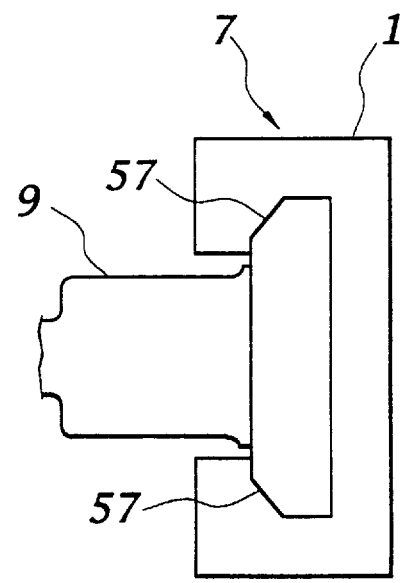
FIG. 8 is a schematic view showing a variation of coupling portions of the gun arm and the gun main body.

FIG. 8 is a schematic view showing a variation of the coupling portions 7 of the gun arm 9 and the gun main body 1, which corresponds to a plan view if viewed from the upper direction in FIG. 3. In this variation, contact surfaces 57 of the power supply portions between the main body side coupling member 25 and the arm side coupling member 29 are formed as inclined surfaces. Thereby, alignment of the pressure electrode 11 with the fixed electrode 13, i.e., centering therebetween can be automatically achieved according to pressure operation by the pressure electrode 11, i.e., welding operation.

Various modifications will become possible for those skilled in the art after receiving the teachings of the present disclosure without departing from the scope thereof.

what is claimed is:

1. A gun arm exchange structure for a spot welding gun comprising:

a gun main body provided to a top end of a robot arm and having a pressure electrode;

a C-shaped gun arm detachably attached to said gun main body and having a fixed electrode, pressure being applied by said pressure electrode on a work which is held between said fixed electrode and said pressure electrode; and a pair of coupling portions, one of the coupling portions fixed on one of the gun main body and the gun arm, and the other of the coupling portions fixed on the other of the gun main body and the gun arm; wherein an insertion recess portion is formed on one side of the both coupling portions, an inner surface of said insertion recess portion being tapered along a direction perpendicular to a pressure direction along which pressure is applied by said pressure electrode toward said fixed electrode, and an insertion portion is formed on the other side of the both coupling portions to have a taper shape which permits said insertion portion to be inserted into said insertion recess portion from a direction perpendicular to said pressure direction and to be fixed therein.

2. A gun arm exchange structure according to claim 1, further comprising pressure receiving portions provided in said coupling portions to receive said pressure applied by said pressure electrode respectively; and power supply portions provided in said pressure receiving portions respectively and having electric contacts which contact mutually to supply electric current from said gun main body to said fixed electrode of said gun arm.

3. A gun arm exchange structure according to claim 1, further comprising a positioning pin provided on said gun main body, said positioning pin being projected toward said gun arm to execute positioning of said gun arm relative to said gun main body when said insertion portion is inserted into said insertion recess portion and fixed therein.

4. A gun arm exchange structure according to claim 1, further comprising:

pressure receiving portions provided in said coupling portions to receive said pressure applied by said pressure electrode respectively;

power supply portions provided in said pressure receiving portions respectively and having electric contacts which contact mutually to supply electric current from said gun main body to said fixed electrode of said gun arm; and a positioning pin provided on said gun main body, said positioning pin being projected toward said gun arm to execute positioning of said gun arm relative to said gun main body when said insertion portion is inserted into said insertion recess portion and fixed therein;

wherein said positioning pin generates surface pressure on said power supply portions by thrusting said gun arm in a state wherein said positioning pin is projected to execute positioning.

5. A gun arm exchange method for spot welding gun including a gun main body provided to a top end of a robot arm and having a pressure electrode, and a C-shaped gun arm detachably attached to said gun main body and having a fixed electrode, pressure being applied by said pressure electrode on a work which is held between said fixed electrode and said pressure electrode, said method comprising the step of:

fitting said gun arm into said gun main body by inserting an insertion portion, which is formed on one of the gun main body and the gun arm to have a taper shape which permits said insertion portion to be inserted into an insertion recess portion from a direction perpendicular to said pressure direction and to be fixed therein, into the insertion recess portion, which is formed on the other of said gun main body and said gun arm, an inner surface of said insertion recess portion being tapered along a direction perpendicular to a pressure direction along which pressure is applied by said pressure electrode toward said fixed electrode.

6. A gun arm exchange structure for a spot welding gun, comprising:

a gun main body provided to a top end of a robot arm;

a pressure electrode disposed on the gun main body and moving along an axis thereof;

a gun arm detachably attached to the gun main body, the gun arm being fixed to the gun main body when the gun arm is attached;

a fixed electrode fixed on the gun arm; and a coupling portion to couple the gun main body and the gun arm, the coupling portion comprising a recess portion and an insertion portion, and the recess portion and the insertion portion relatively moving along the direction perpendicular to the axis that the pressure electrode moves along when the coupling portions are detached or attached.

7. The arm exchange structure as defined in claim 6, wherein the recess portion has a surface perpendicular to the axis that the pressure electrode moves along when the coupling portions are coupled, the surface of the recess portion faces the direction along which the surface receives a pressure from a surface of the insertion portion contacting with the surface of the recess portion when the pressure electrode applies pressure on the fixed electrode.

8. The arm exchange structure as defined in claim 7, wherein the recess portion further comprises a surface tapered shaped along the direction which the recess portion and the insertion portion moves along.

9. The arm exchange structure as defined in claim 7, wherein the insertion portion further comprises a surface tapered shaped along the direction which the recess portion and the insertion portion moves along.

10. The arm exchange structure as defined in claim 6, further comprising:

a pair of power supply terminals each provided in the coupling portion, the terminals contacting to each other to supply electric power from the gun main body to the fixed electrode of the gun arm.

11. A gun arm exchange structure for a spot welding gun comprising:

a gun main body provided to a top end of a robot arm and having a pressure electrode;

a C-shaped gun arm detachably attached to said gun main body and having a fixed electrode pressure being applied by said pressure electrode on a work which is held between said fixed electrode and said pressure electrode; and a pair of coupling portions, one of the coupling portion fixed on one of the gun main body and the gun arm, and the other of the coupling portions fixed on the other of the gun main body and the gun arm; wherein an insertion recess portion is formed on one side of the both coupling portions, and an insertion portion is formed on the other side of the both coupling portions, said insertion portion is permitted to be inserted into said insertion recess portion from a direction perpendicular to said pressure direction and to be fixed therein.

12. A gun arm exchange method for a spot welding gun including a gun main body provided to a top end of a robot arm and having a pressure electrode; and a C-shaped gun arm detachably attached to said gun main body and having a fixed electrode, pressure being applied by said pressure electrode on a work which is held between said fixed electrode and said pressure electrode, said method comprising the steps of:

fitting said gun arm into said gun main body by inserting an insertion portion into an insertion recess portion, said insertion recess portion formed on one side of both coupling portions of said gun main body and said gun arm, said insertion portion formed on other side of both coupling portions, said insertion portion permitted to be inserted into said insertion recess portion from a direction perpendicular to said pressure direction; and fixing said insertion portion in said insertion recess portion.

* * * * *

UNITED STATES PATENT AND TRADEMARK OFFICE
CERTIFICATE OF CORRECTION

PATENT NO. : 5,818,007
DATED : October 6, 1998
INVENTOR(S) : Makoto ITATSU

It is certified that error appears in the above-indentified patent and that said Letters Patent is hereby corrected as shown below:

Item [73]
On the cover sheet, under Assignee, change "Mortor" to --Motor--

Signed and Sealed this

Second Day of March, 1999

Attest:

Q. TODD DICKINSON

Attesting Officer

Acting Commissioner of Patents and Trademarks